Patented Apr. 28, 1931

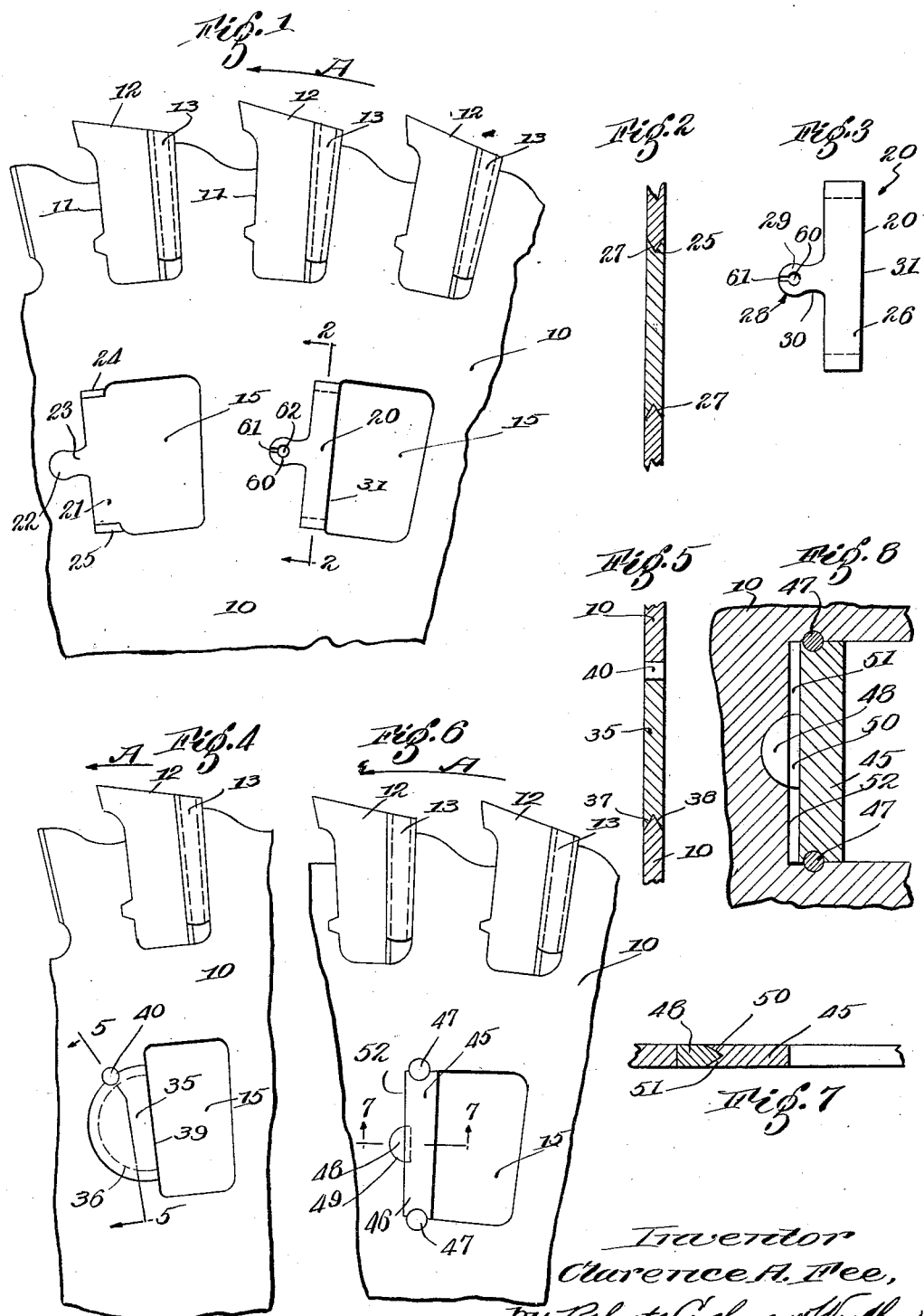

1,803,103

UNITED STATES PATENT OFFICE

CLARENCE A. FEE, OF CHICAGO, ILLINOIS, ASSIGNOR TO SIMONDS SAW AND STEEL COMPANY, OF FITCHBURG, MASSACHUSETTS, A CORPORATION OF MASSACHUSETTS

CIRCULAR SAW AND METHOD OF MAKING THE SAME

Application filed December 3, 1927. Serial No. 237,427.

This invention relates to an improvement in a circular saw, and more particularly in a circular saw of the type actuated by a driving sprocket through the engagement of the sprocket teeth with slots in the body of the saw as shown in the patent to Newton 530,791, dated December 11, 1894.

A certain prejudice against saws of this type has arisen due to the fact that the driven edges of the slots are worn away by the pressure and the friction due to the contact of the sprocket teeth therewith, and the saws consequently become unfit and are outlasted by saws of the arbor-driven type. As the edges wear and the slots are enlarged, additional play is provided, which results in a chattering or pounding action. Eventually the slots become so enlarged that the material between the slots is entirely worn away.

The primary object of this invention is to overcome this difficulty by providing a saw in which the body of the saw is protected against such wear by reinforcing the driven edges of the slots. This is preferably done by inserting at the driven edge shoes which may be the same as or harder than the body of the saw. Such shoes as they become worn may be quickly and easily replaced so that the saw may be kept up to full efficiency and with proper attention will last indefinitely.

In the following description and in the drawings which form a part thereof, a saw of the circular metal inserted point type similar to that shown in the patent to Frear 846,196, dated March 5, 1907, is set forth as embodying this invention. That particular type of saw was selected solely for the purpose of illustration, and not of limitation, since it is obvious that other types of saws may embody the invention.

The drawings comprise the following figures:

Fig. 1 is a side elevation of a portion of a saw embodying one form of this invention;

Fig. 2 is an enlarged sectional view taken on the line 2—2 of Fig. 1;

Fig. 3 is an enlarged side elevation of a shoe constituting one element of this invention;

Fig. 4 is a view similar to Fig. 1 illustrating another embodiment of this invention;

Fig. 5 is an enlarged sectional view taken along the line 5—5 of Fig. 4;

Fig. 6 is a view similar to Fig. 1 of a third embodiment of this invention;

Fig. 7 is an enlarged sectional view taken along the line 7—7 of Fig. 6; and

Fig. 8 is a side elevation partially in section illustrating the manner in which the parts are assembled.

In the drawings, the reference numeral 10 indicates a circular metal saw of the inserted point type. This saw is provided at its periphery with a plurality of equally spaced notches 11, in which are inserted saw teeth 12, held in position by means of wedges 13. The construction and mounting of the teeth form no part of the present invention and will not be further described.

In a circular saw of the type illustrated, the saw is rotated by means of a sprocket, the teeth of which engage a circular series of slots. In the drawings a saw of this type is illustrated and the slots designated by the numeral 15. The saw is driven in the direction of the arrow A and the driven or forward edge of the slot receives the pressure and is subject to wear by reason of the friction between the body of the saw metal and the teeth of the sprocket. As pointed out above, the result of such pressure and friction is to wear away the saw metal and consequently enlarge the slots. If permitted this wear will continue until the metal separating the slots is entirely removed and then the saw is, of course, of no further use. It is desired to prevent this wearing away of the saw metal between the slots by reinforcing the driven edges of the slots. Such reinforcement might be attained by hardening the metal at those points or by providing shoes or wearing plates which receive the edges of the teeth. Several ways of reinforcing the edges of the slots by means of shoes are set forth in the drawings.

In Figs. 1, 2 and 3 as shown, the shoe 20 is adapted to be mounted at the forward end of each slot 15. The slot 15 is first enlarged, as indicated at the left in Fig. 1. Such enlargement comprises a substantially rectangular extension 21 and an aperture 22 connected to the extension 21 by a slot 23. The slot 23 is made slightly narrower than the aperture 22 preferably by approximately $\frac{1}{10}$ of an inch. The upper and lower edges of the extension 21 are preferably milled to form integrally pointed tongues 24 and 25. The form of the tongues is shown especially in Fig. 2, from an examination of which it will be clear that each tongue is tapered on both sides to an edge substantially half way between the faces of the shoe metal.

The shoe 20 comprises a rectangular portion 26 provided at each end with a groove 27 and at one edge with a boss 28 having a head 29 and a shank 30. The rectangular portion 26 of the shoe 20 is of substantially the dimensions of the extension 21, plus the tongues 24, 25. The head 29 of the boss 28 is of the dimension of the aperture 22 and the shank 30 is of the dimension of the slot 23. The slots 15 having been enlarged and the shoes 20 made as above described, a shoe will be inserted into the slot 15 and the head 29 forced through the slot 23 into the aperture 22. The slight difference between the dimensions of the head 29 and the slot 23 permits a driving of the head 29 through the slot 23 into the aperture 22, and when once in place the shoe is held by the boss against removal. As the head 29 is driven through the slot 23 the shoe is guided by means of the grooves 27, which receive the tongues 24, 25. When the shoe 20 is in place, the contact of the sprocket teeth during the driving operation will be against the edge 31 of the shoe. The shoe may be made of the same material as the plate from which the shoe is made, but preferably it is made of a harder material so as to resist any tendency to wear. If desired the head 29 may have a hole 60 and slot 61 (Fig. 3) extending therethrough for the insertion of a rivet 62 (Fig. 1) for holding the shoe more tightly in place after insertion into place.

Figs. 4 and 5 illustrate another type of shoe which may be employed for the same purpose. This shoe, designated as 35, is adapted to be inserted in an extension 36 of the slot 15. The extension 36 is preferably greater than a semi-circle and the edges of the saw plate 10 are provided with a tongue 37 which extends around the edges of the extension 36. The shoe 35 is a segmental plate, the curved edge of which is provided with a groove 38. The shoe 35 is mounted in the extension 36 by inserting one end of the shoe into the extension and then twisting in the well-known manner until the straight edge 39 of the shoe 35 forms a continuation of the forward edge of the slot 15. The engagement of the edges of the extension and of the shoe prevent the shoe from being removed inadvertently, and key 40 is provided to prevent twisting of the shoe under working conditions.

Figs. 6, 7 and 8 illustrate a third embodiment which comprises a shoe 45 consisting of a substantially rectangular plate adapted to be mounted in a similarly formed extension 46 of the slot 15. The shoe 45 is held against lateral movement by means of a pair of keys 47 and is held against other shifting by means of a key 48 which is forced into a hole 49 in the body of the shoe, and has a tapered edge 50 which enters a milled slot 51 formed in the forward edge 52 of the shoe 45.

It will be noted that the shoe described in each embodiment is rigidly secured in position but that they can be removed when desired and other shoes substituted therefor. This feature renders it possible to replace the shoes in the saw, when they become worn under use, with new shoes so that the saw is kept at all times in the proper condition.

I claim:

1. In a saw provided with slots for engagement with sprocket teeth, means for reinforcing the driven edges of the slots, said means comprising a metal plate, for each slot, said plate being recessed at each end to engage the upper and lower edges of the slot, and a boss integral with said plate the body of the saw being cut away adjacent each slot to receive said boss for locking the plate in position.

2. In a saw provided with slots for engagement with sprocket teeth, means for reinforcing the driven edges of the slots, said means comprising a metal plate for each slot, said plate being recessed at each end to engage the upper and lower edges of the slot, and a boss integral with said plate having a curved outer end and a neck connecting said end and said plate the body of the saw having a complementary recess therein adjoining each slot to receive the boss and to fit about the body of the boss and about said neck for holding the plate in position.

3. In a saw adapted to be operated by the engagement of sprocket teeth with slots in the body of the saw, the method of reinforcing the driven edges of the slots consisting in milling the upper and lower edges of each slot adjacent the driven edge, forming an aperture in the saw in front of the slot, and connecting said aperture with the driven edge of the slot by a passage and inserting a shoe, the ends of which will engage such edges, said shoe having a boss which will enter said aperture and said passage.

4. In a saw adapted to be operated by the engagement of sprocket teeth with slots in the body of the saw, the method of reinforcing the driven edges of the slots consisting in enlarging each slot at the driven end, milling certain edges of the enlarged portion, inserting in said enlarged portion a shoe, certain edges of which have been recessed to engage the milled portions of said enlargement and securing said shoe in position.

5. A circular saw having a circumferential row of substantially radially extending slots for engagement with gearing, the slots being enlarged on the sides of their forward edges to receive complementary wear strips, wear strips fitting the enlarged portions of the slots, and complementary interfitting projections extending circumferentially of the saw and along the respective upper and lower edges of the enlarged portions and of the wear strips of locking the wear strips against axial movement relative to the saw.

6. The combination as set forth in claim 5, wherein slots extend radially of the saw for a greater distance than the wear strips, whereby the wear strips may be positioned in the slots in alignment with the enlarged portions thereof and pushed into the enlarged portions to effect engagement of the complementary interfitting projections.

7. A circular saw having a circumferential row of substantially radially extending slots for engagement with sprocket teeth, the forward edges of each slot being cut away to provide an elongate recess to receive a wear strip and also to provide another recess communicating with said elongate recess through a restricted passage, wear strips fitting the elongate recesses, each wear strip having an extension comprising a neck portion adapted to fit the restricted passage and an end portion receivable in said another recess, the end portion being expansible and contractible to permit insertion and removal thereof through the restricted passage.

8. The combination as set forth in claim 7, and means for locking the end portion of each extension in its expanded condition for locking the wear strips in the recesses.

9. The combination as set forth in claim 7, and means for locking the wear strips against relative movement in a direction axially of the saw.

Signed by me at Chicago, Ill., this 18th day of November, 1927.

CLARENCE A. FEE.